(12) United States Patent
Sawicki (10) Patent No.: US 9,637,401 B1
(45) Date of Patent: May 2, 2017

(54) COMBINATION HYDRO-AIR PUMP AND METHOD OF USE THEREOF

(71) Applicant: EUGENE G. DANNER MANUFACTURING INC., Islandia, NY (US)

(72) Inventor: Steven R. Sawicki, Stony Brook, NY (US)

(73) Assignee: EUGENE G. DANNER MANUFACTURING INC., Islandia, NY (US)

( * ) Notice: Subject to any disclaimer, the term of this patent is extended or adjusted under 35 U.S.C. 154(b) by 86 days.

(21) Appl. No.: 14/827,565

(22) Filed: Aug. 17, 2015

Related U.S. Application Data

(60) Provisional application No. 62/043,488, filed on Aug. 29, 2014.

(51) Int. Cl.
| | |
|---|---|
| *B01F 3/04* | (2006.01) |
| *C02F 1/74* | (2006.01) |
| *A01K 63/04* | (2006.01) |
| *B01F 15/02* | (2006.01) |
| *B01F 7/00* | (2006.01) |
| *C02F 103/00* | (2006.01) |

(52) U.S. Cl.
CPC ............ *C02F 1/74* (2013.01); *A01K 63/042* (2013.01); *A01K 63/045* (2013.01); *B01F 3/0446* (2013.01); *B01F 3/04099* (2013.01); *B01F 3/04531* (2013.01); *B01F 7/00341* (2013.01); *B01F 15/0243* (2013.01); *B01F 2003/04872* (2013.01); *B01F 2003/04943* (2013.01); *B01F 2215/0052* (2013.01); *C02F 2103/007* (2013.01); *C02F 2201/002* (2013.01)

(58) Field of Classification Search
CPC ..... B01F 3/04; B01F 3/04099; B01F 3/04531
USPC ................ 261/77, 93, DIG. 75; 210/170.01, 210/170.09, 219, 220, 221.2; 417/420
See application file for complete search history.

(56) References Cited

U.S. PATENT DOCUMENTS

| | | |
|---|---|---|
| 2,533,936 A | 12/1950 | Holmes et al. |
| 3,321,081 A | 5/1967 | Willinger |
| 3,392,836 A | 7/1968 | Willinger |
| 3,516,543 A | 6/1970 | Willinger |
| 4,154,681 A | 5/1979 | Shields et al. |
| 5,078,867 A | 1/1992 | Danner |
| 5,139,659 A | 8/1992 | Scott |
| 5,586,862 A | 12/1996 | Danner |
| 5,967,744 A | 10/1999 | Danner |
| 6,309,188 B1 | 10/2001 | Danner |

(Continued)

*Primary Examiner* — Robert A Hopkins
(74) *Attorney, Agent, or Firm* — Galgano IP Law PLLC; Thomas M. Galgano; Jessica G. McDonald (57) ABSTRACT

A combination water and air pump and method of use, for simultaneously circulating and aerating water. The pump including a housing, a first chamber for circulating water, having an inlet for water to be drawn into the first chamber and an outlet for water to exit the first chamber, a second chamber for aerating water, having an inlet for water to be drawn into the second chamber, an apparatus to draw air into the second chamber, and an outlet for aerated water to exit the second chamber. A rotatable shaft connected to a first rotatable impeller in the first chamber and a second rotatable impeller in the second chamber. In use, rotation of the shaft simultaneously rotates the impellers to circulate water within said first and second chambers.

20 Claims, 10 Drawing Sheets

FIG. 1

(56) References Cited

U.S. PATENT DOCUMENTS

| | | | |
|---|---|---|---|
| 6,551,078 B2 * | 4/2003 | Huang | F04B 17/042 210/167.26 |
| 6,857,392 B1 | 2/2005 | Shyu | |
| 8,033,252 B2 | 10/2011 | Allis | |

* cited by examiner

COMBINATION HYDRO-AIR PUMP AND METHOD OF USE THEREOF

CROSS-REFERENCE TO RELATED APPLICATION

This application claims benefit from U.S. Provisional Patent Application Ser. No. 62/043,488 filed Aug. 29, 2014, the contents of which are hereby incorporated by reference.

BACKGROUND OF THE INVENTION

Field of the Invention

The invention is generally in the field of pumps for ponds. Particularly, the present invention is a combination water pump and air generation/dispersion device. More particularly, the present invention is a combination water pump and air pump which is used for the simultaneous circulation and aeration of water. The pump is suitable for use primarily in pond applications, however, it is also suitable for use in aquariums.

Brief Description of the Prior Art

In ponds, water movement is typically required when a separate stand alone filter is used to clean and filter the water contained within the pond. The current methods of circulating water within a pond environment and providing oxygenation to the water involves the use of two separate and independent devices, namely, a water pump and a separate air pump.

A conventional water pump is often utilized to circulate water contained within a pond at a given flow rate and required head height. Prior art water pumps to circulate water in a pond or aquarium are known, such as those set forth in U.S. Pat. Nos. 6,309,188, 5,967,744 and 5,586,862 to Michael Danner, the contents of which are hereby incorporated by reference. In prior art pond environments, typically a separate air pump is also utilized to aerate the water, through the use of an air stone submerged in the water which operates to introduce air into the water.

However, the prior art systems require separate devices to aerate and circulate water within the pond or aquarium. These separate devices each require an electrical connection and, thus, two outlets are required to connect the two separate devices to a source of electrical power. The present invention eliminates the need for two separate devices to circulate and aerate the water and thus, also eliminates the need for two separate outlets. While the prior art discloses various devices for circulating or aerating water in a pond or aquarium, so far as is known, none of these devices and methods resolve the deficiencies noted above, as in the present invention.

BRIEF SUMMARY OF THE INVENTION

It is an object of the present invention to provide a novel combination water pump and air pump for simultaneously circulating and aerating water and a method of use thereof.

It is also an object of the present invention to provide a single device that will not only move and circulate water throughout the container (i.e., pond, aquarium, etc.), but will also aerate the water contained therein.

It is yet another object of the present invention to provide a pump having two opposite ends which perform separate functions, namely, one end operates to pump water and the opposite end operates to oxygenate the water.

It is an additional object of the present invention to provide a single magnetically rotatable shaft which simultaneously rotates an impeller on each of its ends to both circulate and aerate the water.

Certain of the foregoing and related objects are readily attained according to the present invention through the provision of a combination water pump and air pump for simultaneously circulating and aerating water, comprising a housing having a first end defining a first chamber having an inlet for water to be drawn into said first chamber and an outlet for water to exit said first chamber, said housing having an opposite second end defining a second chamber having an inlet for water to be drawn into said second chamber, means to draw air into said second chamber, and an outlet for aerated water to exit said second chamber; a rotatable shaft extending through said housing, having a first end and an opposite second end; a first rotatable impeller for circulating water, disposed within said first chamber and connected to said first end of said shaft, and a second rotatable impeller for aerating water, disposed within said second chamber and connected to said second end of said shaft, wherein rotation of said shaft simultaneously rotates said first and second impellers to circulate water within said first and said second chambers, respectively; and means to rotate said shaft.

Desirably, said shaft has a key on each of said first and second ends thereof and said first and second impellers each have a corresponding key which engages with said keys on said first and second ends of said shaft, respectively. It is also desirable that said first and second impellers each further comprise a central hub which engages with said first and second ends of said shaft, respectively, and a plurality of paddles connected to said central hub and extending outwardly therefrom. In the preferred embodiment, said paddles on said second impeller are generally U-shaped.

Advantageously, said shaft is magnetic and said means to rotate said shaft and said impellers is at least one magnet enclosed within said housing. In the preferred embodiment, said means to rotate said shaft and said impellers is a stator enclosed within said housing, which creates alternating magnetic fields to rotate said shaft.

It is also desirable that said second chamber further comprises an upwardly projecting hollow stem defining an air inlet opening and said means to draw air into said second chamber comprises a hollow tube, having opposite open ends, one of which is connected to said hollow stem and the other of which is communicatable with atmosphere, to draw air into said air inlet opening. Advantageously, the pump further comprises a diffuser connected to said outlet of said second chamber, said diffuser comprising a generally vertically disposed hollow tube extending upwardly from said outlet of said second chamber, said hollow tube having an outer peripheral edge and a generally horizontally disposed rim extending outwardly from said outer peripheral edge, said diffuser further comprising a generally horizontally disposed ceiling disposed above said hollow tube, which is connected to and spaced-apart from said rim, to diffuse air bubbles horizontally. Desirably, the pump further comprises ring-shaped bubble barriers mounted over said hubs of said first and second impellers, to prevent air bubbles from entering said housing. Furthermore, it is advantageous that said first and second chambers are volutes. Preferably, said shaft is generally cylindrically shaped. Desirably, said inlet of said second chamber is tapered and comprises ribs formed on an inside surface thereof.

Certain of the foregoing and related objects are also readily attained according to the present invention through the provision of a method for simultaneously moving and oxygenating water, comprising the steps of providing a body of water; providing a combination water pump and air pump for simultaneously circulating and aerating water, comprising a housing having a first end defining a first chamber having an inlet for water to be drawn into said first chamber and an outlet for water to exit said first chamber, said housing having an opposite second end defining a second chamber having an inlet for water to be drawn into said second chamber, means to draw air into said second chamber, and an outlet for aerated water to exit said second chamber; a rotatable shaft extending through said housing, having a first end and an opposite second end; a first rotatable impeller for circulating water, disposed within said first chamber and connected to said first end of said shaft, and a second rotatable impeller for aerating water, disposed within said second chamber and connected to said second end of said shaft, wherein rotation of said shaft simultaneously rotates said first and second impellers to circulate water within said first and said second chambers, respectively; and means to rotate said shaft; submersing said combination water pump and air pump into said water; rotating said shaft and said impellers simultaneously via said means to rotate, to draw water into said inlet of first chamber and to draw water and air into said second chamber; and discharging water from said outlet of said first chamber and discharging aerated water from said outlet of said second chamber.

Advantageously, said body of water is a pond. Preferably, said shaft has a key on each of said first and second ends thereof and said first and second impellers each have a corresponding key which engages with said keys on said first and second ends of said shaft, respectively. Desirably, said first and second impellers each further comprise a central hub which engages with said first and second ends of said shaft, respectively, and a plurality of paddles connected to said central hub and extending outwardly therefrom. Preferably, said paddles on said second impeller are generally U-shaped. It is also preferred that said shaft is magnetic and said means to rotate said shaft and said impellers is at least one magnet enclosed within said housing. Advantageously, said means to rotate said shaft and said impellers is a stator enclosed within said housing, which creates alternating magnetic fields to rotate said shaft. Preferably, said second chamber further comprises an upwardly projecting hollow stem defining an air inlet opening and said means to draw air into said second chamber comprises a hollow tube, having opposite first and second open ends, said first end being connected to said hollow stem and said second end being communicatable with atmosphere, to draw air into said air inlet opening; and said method further comprises the step of positioning said second open end of said hollow tube in communication with atmosphere, to draw air into said air inlet opening.

DETAILED DESCRIPTION OF THE INVENTION

Figure 1:
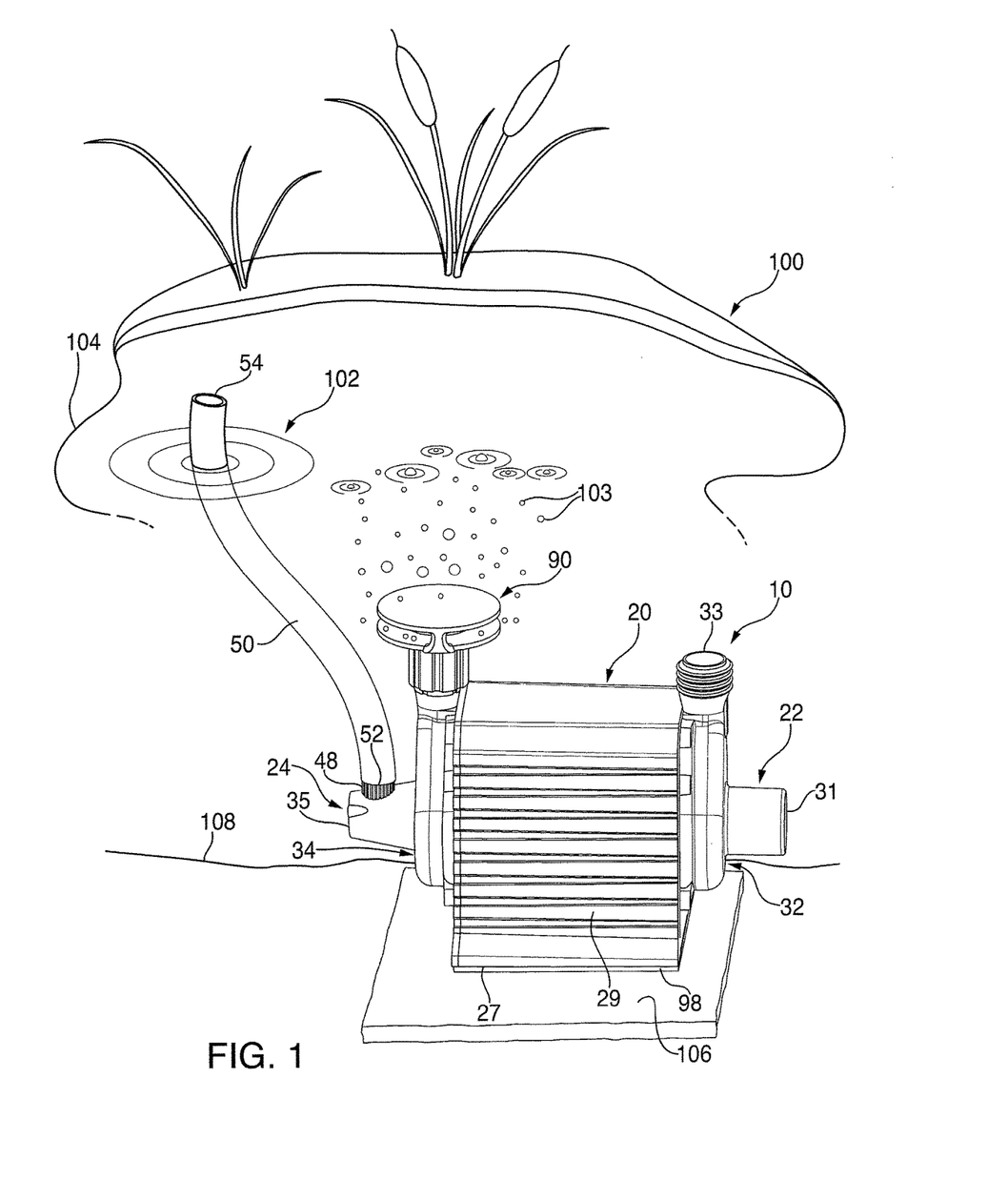
FIG. 1 is a perspective view of the combination hydro-air pump, according to the present invention, submersed in the water in a pond.

Turning now in detail to the drawings and specifically FIG. 1, which illustrates the combination hydro-air pump, according to the present invention, generally designated by reference numeral 10. Particularly, pump 10 is a combination water pump and air pump which is primarily intended to be used in pond applications to simultaneously move water 102 in a pond 100 as well as to aerate and add oxygen into the water 102 contained within the pond 100. However, pump 10 can be used in other desired applications such as in aquarium applications (not shown). In use, pump 10 is submersed into the water 102, beneath the waterline 104 of a pond 100 or aquarium (not shown). Pump 10 has a lower base surface 27 preferably having a rubber anti-vibration pad 98 adhered thereto, which in turn, sits atop and rests upon a mounting surface 106 in the pond 100. While the preferred embodiment of the present invention includes pad 98 adhered to base surface 27 of pump 10, such pad 98 can be eliminated or other means to affix pad 98 to base surface 27 can be utilized. It is preferred that pump 10 is positioned to rest upon a mounting surface 106 which is raised up and disposed higher than the bottom surface 108 of the pond 100. Thus, the use of bricks, slate or blocks which rest on the bottom surface 108 of the pond 100 are particularly suitable. Placement on an elevated mounting surface 106 raises pump 10 above the bottom surface 108 of the pond 100 to reduce algae growth on pump 10. It is also preferable that pump 10 is positioned on the mounting surface 106 deepest part of pond 100.

Pump 10 operates electrically similar to other magnetically driven water pumps and is connected to a source of power, such as an electrical outlet, through an electrical cord (not shown). The electrical connections and power sources necessary to power pump 10 would be well known to those having ordinary skill in the art.

Figure 8:
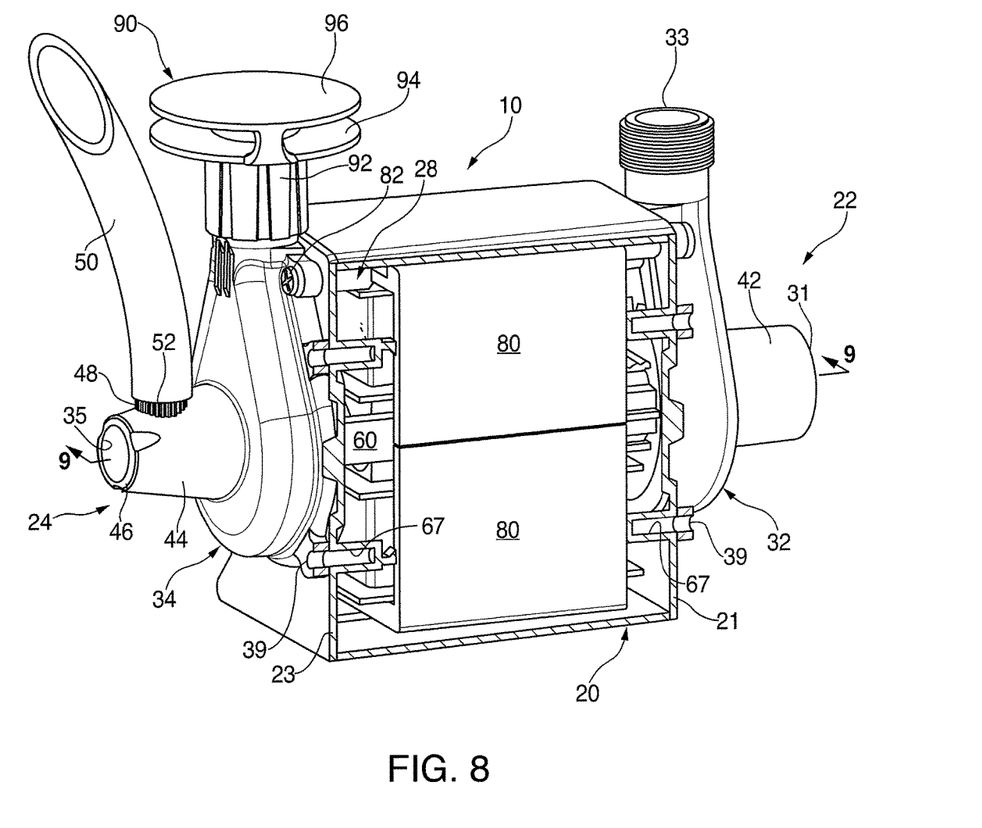
FIG. 8 is a perspective view of the combination hydro-air pump of the present invention with a side wall of the housing removed to show the stator and rotatable shaft.
Figure 9:
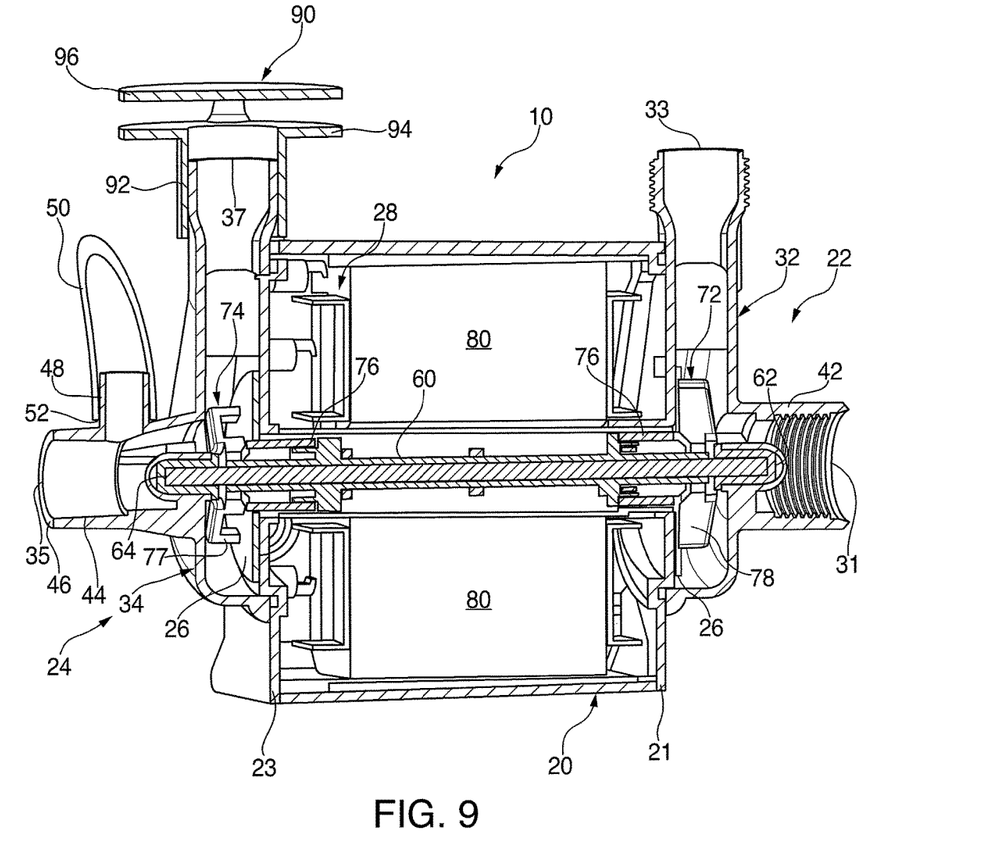
FIG. 9 is a cross-sectional view of the combination hydro-air pump along line 9-9 of FIG. 8.

As shown in FIGS. 1 and 8-9, pump 10 includes a housing 20 which has two opposite ends 22 and 24 and a centrally located magnet chamber 28 disposed between ends 22 and 24. Preferably, housing 20 is made of Acrylonitrile Butadiene Styrene (ABS) plastic, however, it can be appreciated that other suitable materials can be utilized and would be well known to a person having ordinary skill in the art. First end 22 of pump 10 performs the function of a water pump that circulates water 102 within pond 100. The opposite second end 24 of pump 10 performs the function of introducing air 103 into water 102, as discussed more fully below. As a result, pump introducing air 103 into water 102, as discussed more fully below. As a result, pump 10 simultaneous circulates as well as aerates water 102 within pond 100, via a single device, thus eliminating the necessity of having two separate devices to achieve the water circulation and aeration functions needed in the pond 100.

Figure 4:
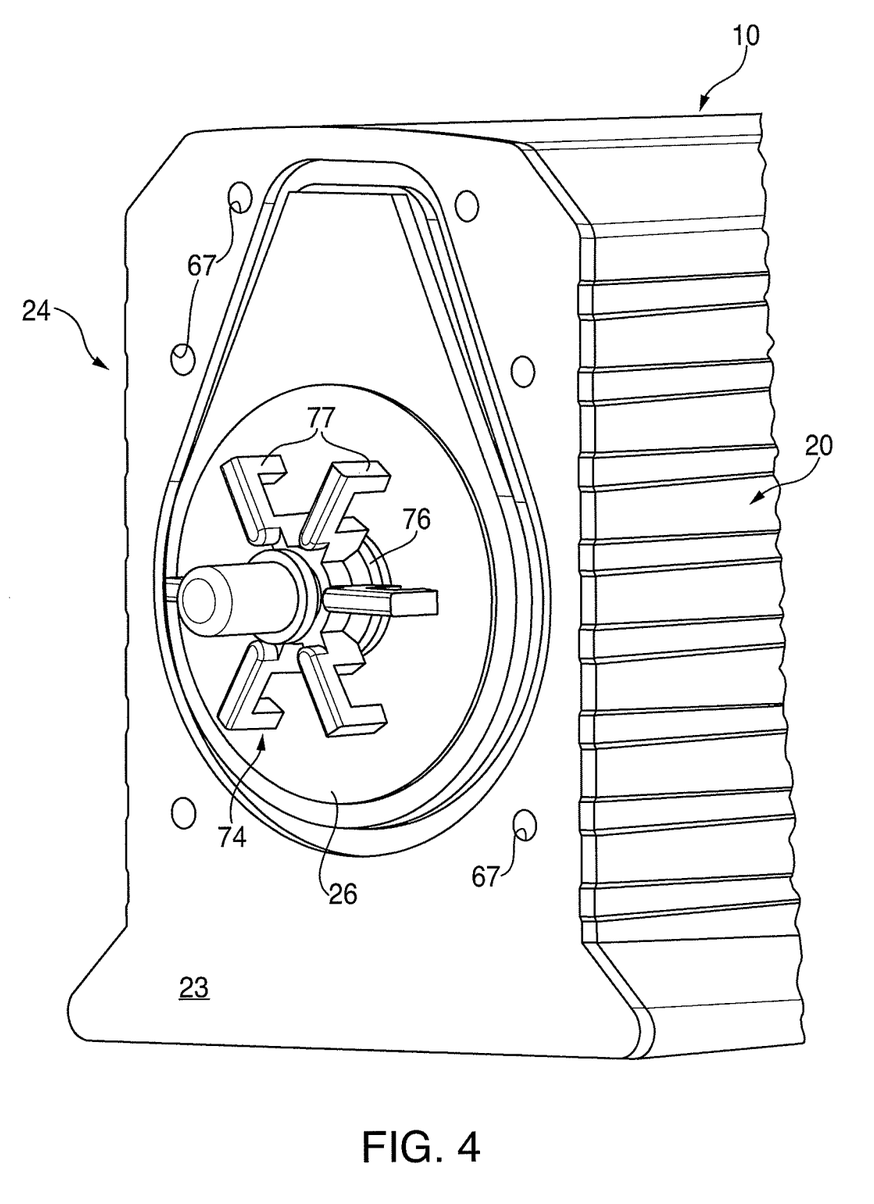
FIG. 4 is a view of the air pump side of the pump, with the volute removed to illustrate the rotatable impeller and bubble barrier.
Figure 5:
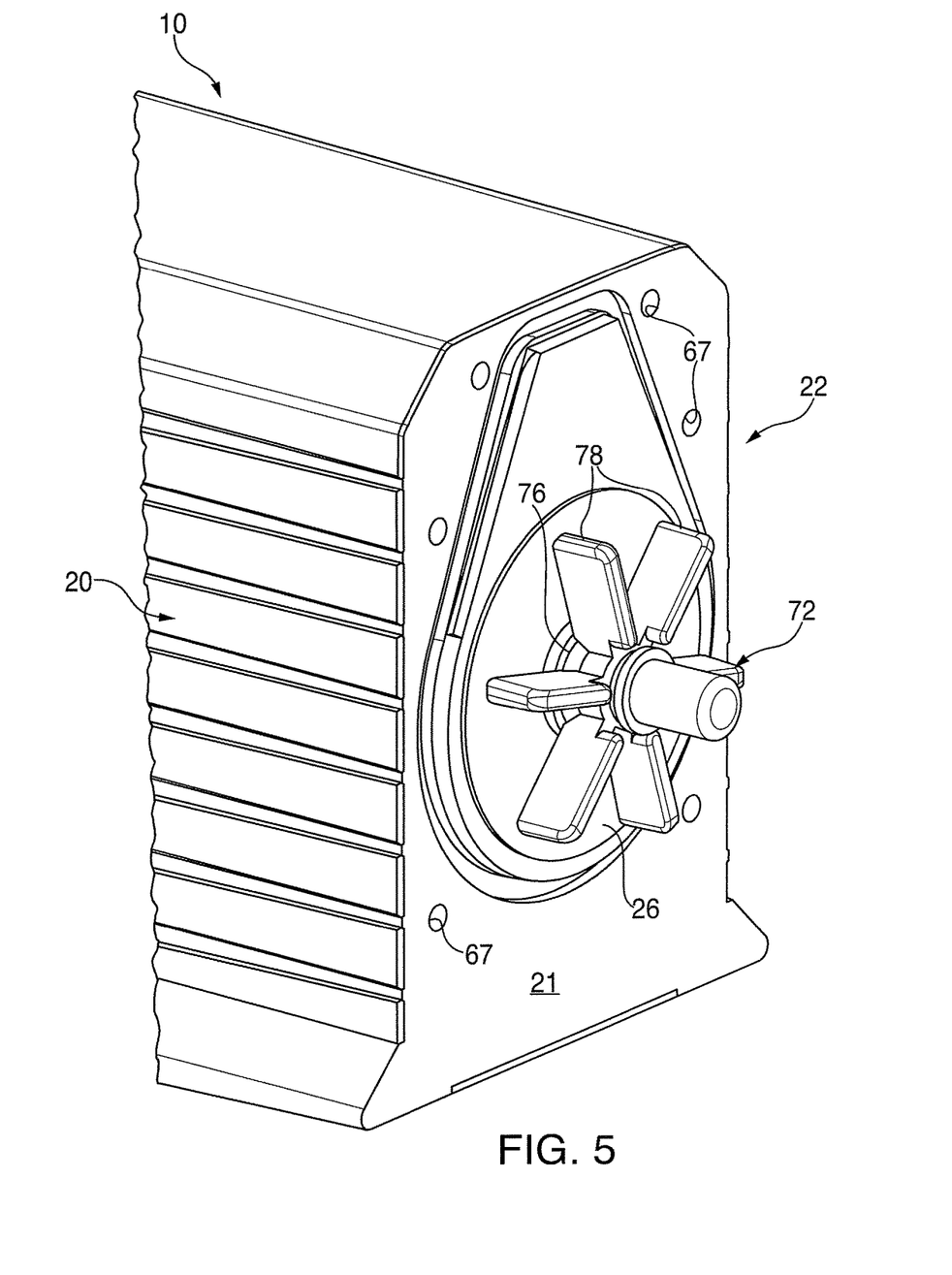
FIG. 5 is a view of the water pump side of the pump, with the volute removed to illustrate the rotatable impeller and bubble barrier.
Figure 6:
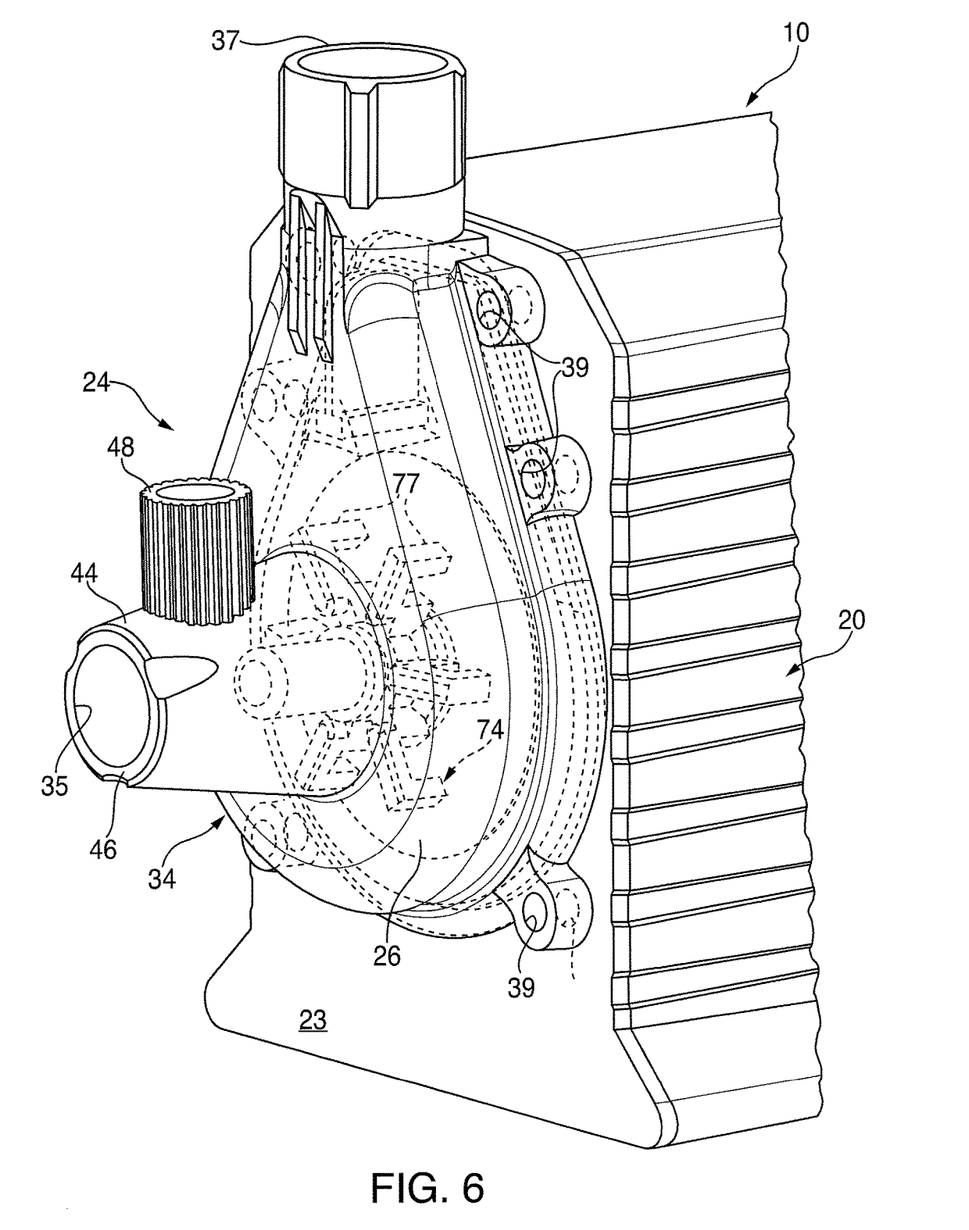
FIG. 6 is a perspective view of the air pump side of the pump with the volute mounted on the housing and the impeller and bubble barrier enclosed within the volute.
Figure 7:
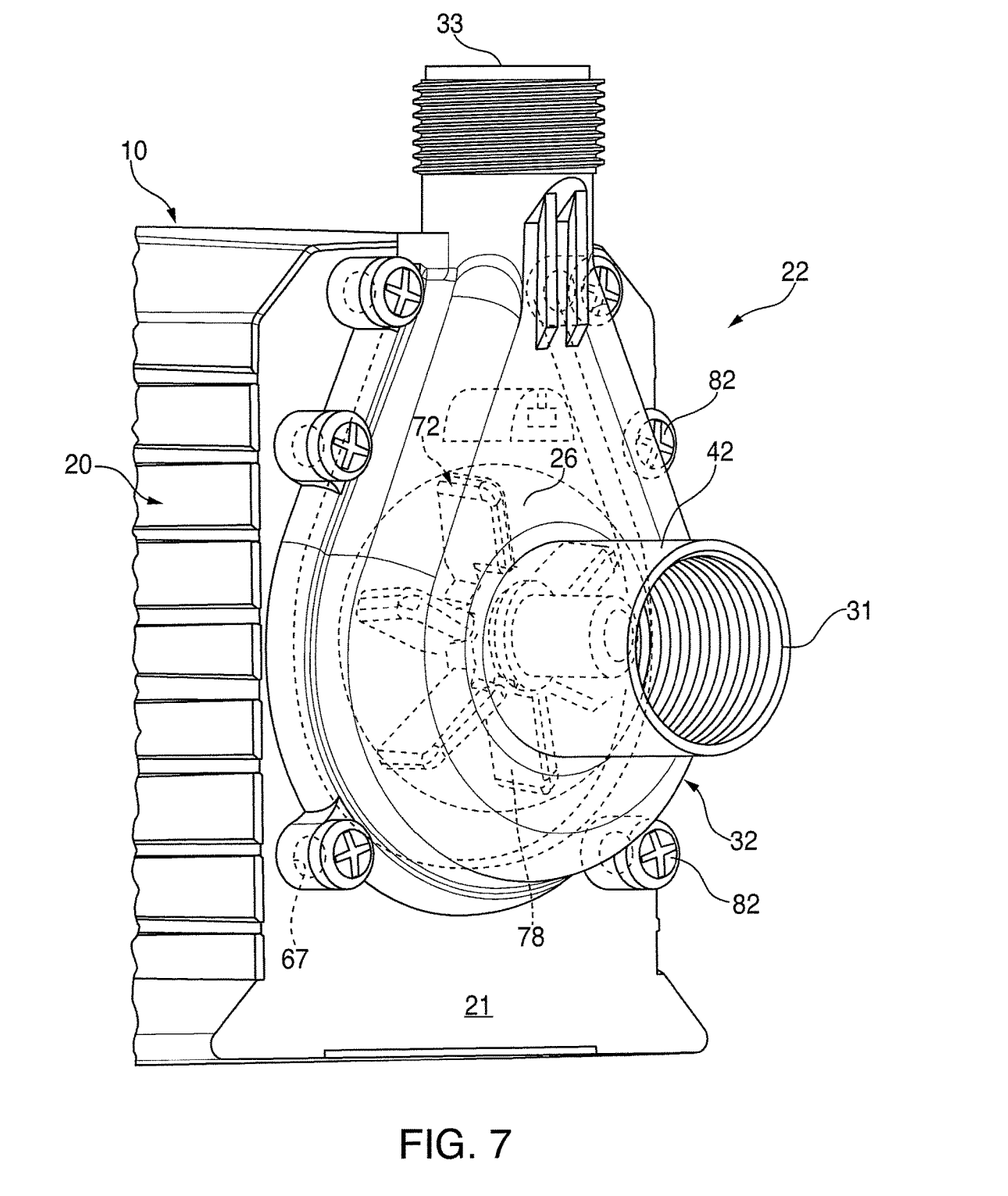
FIG. 7 is a perspective view of the water pump side of the pump with the volute mounted on the housing and the impeller and bubble barrier enclosed within the volute.

As also shown in FIG. 1, end 22 of housing 20 includes a first chamber or volute 32 and the opposite end 24 of housing 20 includes a second chamber or volute 34. Particularly, magnet chamber 28 has two opposite sidewalls 21 and 23. As seen best in FIG. 5, sidewall 21 is disposed on end 22 of housing 20 and, as seen in FIG. 4, sidewall 23 is disposed on end 24 of housing 20. As seen in FIGS. 4-5, sidewalls 21 and 23 each have a plurality of screwholes 67 formed therein. As shown in FIGS. 1 and 7, volute 32 is mounted to sidewall 21 of magnet chamber 28, and as seen in FIGS. 1 and 6, volute 34 is mounted to sidewall 23 of magnet chamber 28. Particularly, volutes 32 and 34 have a plurality of screwholes 39 formed therein and screws 82 extends through screwholes 39 formed in volutes 32 and 34 and into screwholes 67 of sidewalls 21 and 23 to secure the volutes 32 and 34 to housing 20. However, other suitable methods of attachment between volutes 32 and 34 and housing 20 are possible.

As seen best in FIGS. 6-7, chambers 32 and 34 are in the shape of volutes or curved funnels that have a generally circular shaped central cavity portion and a generally funnel shaped outlet. As seen in FIG. 7, volute 32 includes a generally centrally disposed tubular inlet 31 for water to be drawn into volute 32 from pond 100 and an upper tubular outlet opening 33 for water 102 to exit from volute 32, at a and have screw threads for mating attachment to various fittings, such as, for example, a filter. As seen best in FIG. 7, inlet 31 of volute 32 is disposed generally centrally on the circular shaped central portion of volute 32 and comprises a laterally outwardly extending cylindrical tube 42, through which water 102 is drawn into volute 32.

Similarly, as seen in FIG. 6, volute 34 includes a generally centrally disposed tubular inlet 35 for water to be drawn into volute 34 from pond 100 and an upper tubular outlet 37 for aerated water 102 to exit from volute 34, at a certain velocity. The velocity and flow rates of pump 10 may vary according to the specific application and volume of water to be pumped. However, preferably, pump 10 runs at full rotational velocity to achieve maximum flow rates. As seen in FIG. 6, inlet 35 of volute 34 is disposed generally centrally on the circular shaped central cavity portion of volute 34. Inlet 35 comprises a laterally outwardly extending venturi tube 44 which is tapered inwardly on its outer end 46, and through which water 102 is drawn into volute 34. As seen best in FIG. 10, volute 34 also includes three linear ribs 81 which are formed on the inside of venturi tube 44 of inlet 35 of volute 34, which aid in introducing air into the water.

Furthermore, as seen in FIG. 1, volute 34 includes means to draw air into the interior of volute 34 from the atmosphere above the waterline 104 of pond 100, to be introduced into the water 102 contained within pond 100. Particularly, as seen in FIG. 6, the upper surface of venturi tube 44 of volute 34 includes an upwardly projecting hollow stem 48 defining an air inlet opening which is in fluid in communication with venturi tube 44 and, in turn, volute 34. Hollow stem 48 is disposed generally centrally on venturi tube 44. As shown in FIG. 1, pump 10 also includes a hollow tube 50 having two opposite open ends 52 and 54. End 52 is connected in fluid communication with hollow stem 48 and open end 54 is positioned above waterline 104 and in communication with the atmosphere. Preferably, tube 50 is ½" diameter flexible vinyl tubing that has a length sufficient to extend from hollow stem 48 to above the waterline 104. Stem 48 also has a dimension to allow tube 50 to connect thereto, preferably with a friction fit. However, other suitable materials and dimensions of tube 50 may be used and tube 50 can be of a flexible or rigid material. During operation, air is drawn into volute 34 from the atmosphere above the waterline 104 of pond 100, via end 54 of hollow tube 50. The air exits end 52 of hollow tube 50 into hollow stem 48, and in turn into venturi tube 44 of inlet 35 and, subsequently enters volute 34.

Figure 2:
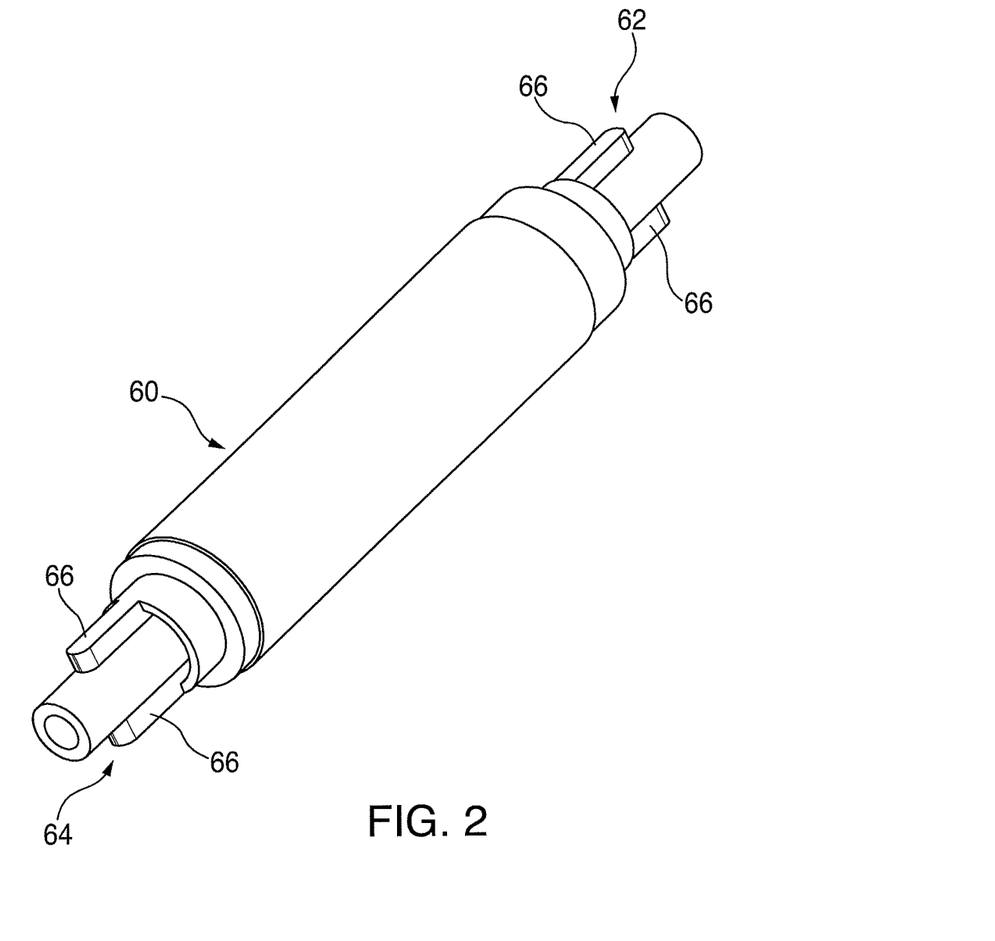
FIG. 2 is a perspective view of the rotatable shaft of the pump of the present invention, with the impellers removed to illustrate the dual set of keys.
Figure 3:
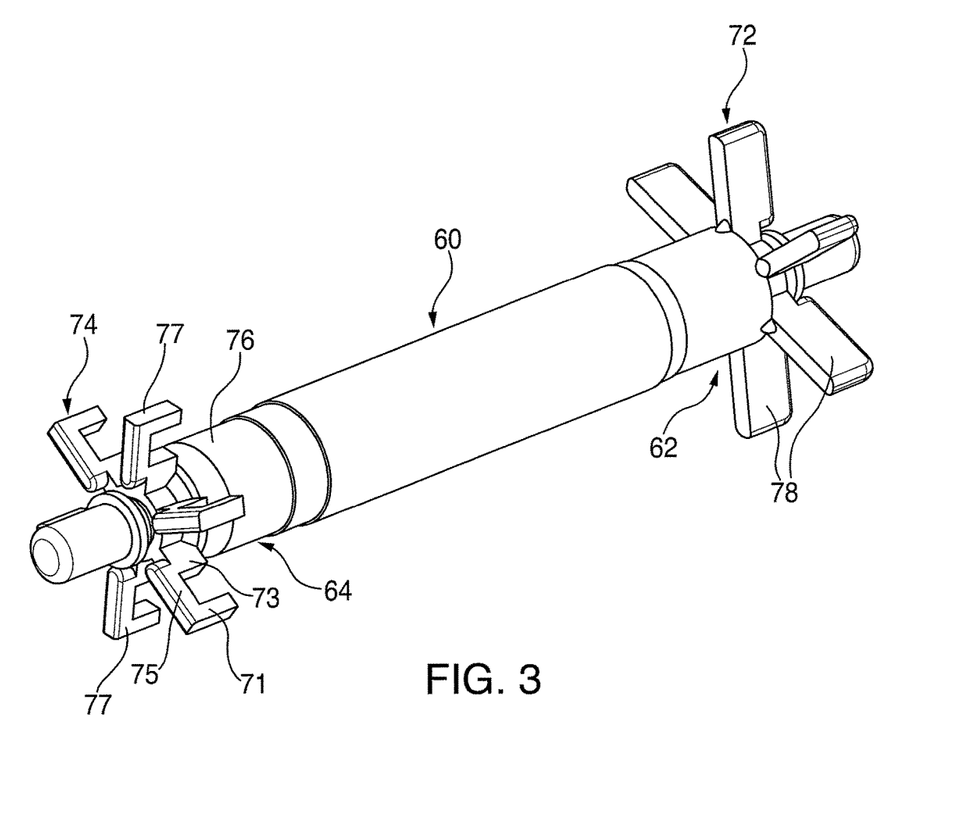
FIG. 3 is a perspective view of the rotatable shaft of the pump of the present invention, with an impeller on each of its ends.

Furthermore, as seen in FIGS. 2 and 3, the pump 10 according to the present invention includes a novel and uniquely designed generally cylindrical rotatable shaft 60 which, as shown best in FIG. 9, extends through housing 20. Particularly, as shown in FIG. 2, shaft 60 has a first end 62, an opposite end 64, and, in the preferred embodiment is magnetic. Additionally, as shown in FIG. 3, pump 10 includes a first rotatable impeller 72 connected to first end 62 of shaft 60 and a second rotatable impeller 74 connected to second end 64 of shaft 60.

As shown in FIG. 9, shaft 60 extends generally centrally through magnet chamber 28 of housing 20, with its ends 62 and 64 projecting outwardly from sides 21 and 23 of magnet chamber 28 and into volutes 32 and 34, respectively. As shown in FIG. 7, impeller 72 is disposed within volute 32 and, as seen in FIG. 6, impeller 74, is disposed within volute 34. Particularly, the central axis of impeller 72 is generally in alignment with the center line of inlet 31 and the central axis of impeller 74 is generally in alignment with the center line of inlet 35. Impellers 72 and 74 are connected to shaft 60 such that rotation of shaft 60 simultaneously rotates impellers 72 and 74, within volutes 32 and 34, respectively. The rotation of shaft 60 and impellers 72 and 74 creates suction to draw water into volute 32 and both air and water into volute 34. The shape of the generally circular-shaped central cavity of volutes 32 and 34 corresponds to the overall circular-shape of impellers 72 and 74, enclosed therein, to allow for frictionless movement of the liquid within the volutes 32 and 34. The dimensions of the impellers 72 and 74 as well as volutes 32 and 34 can vary depending on the application and volume of water to be pumped. However, the relative dimension between volutes 32 and 34 and impellers 72 and 74 allows for frictionless liquid movement within volutes 32 and 34.

As seen best in FIG. 3, impellers 72 and 74 each include a central hub 76 which engages with first end 62 and second end 64 of said shaft 60, respectively. As also seen in FIG. 3, impellers 72 and 74 include a plurality of paddles 78 and 77, respectively, connected to central hubs 76 and which extend radially outwardly therefrom. As shown in FIGS. 3-5, six (6) impeller paddles 78 and 77, respectively, are disposed on each of impellers 72 and 74. However, the impeller design can vary according to the pump output design and the number and dimensions of the impeller paddles can vary depending on the specific application. As seen in FIGS. 3 and 5, paddles 78 on impeller 72 are generally rectangularly shaped.

As also seen in FIGS. 3-4, paddles 77 on impeller 74 are generally U-shaped. Particularly, impeller 74 has a plurality of generally U-shaped impeller paddles 77 extending outwardly from hub 76. As seen in FIG. 3, impeller paddles 77 of impeller 74 each have a first leg 71 and a second leg 73, which are connected by a base leg 75, to form the generally U-shaped configuration. This generally U-shaped configuration of paddles 77 of impeller 74 creates a hollow channel collectively between the first leg 71, second leg 73, and base leg 75 of each of the paddles 77, that reduces the volume of water that is moved during rotation of impeller 74.

In the preferred embodiment of the present invention, shown in FIG. 2, shaft 60 incorporates a set of keys 66 on ends 62 and 64 to engage with impellers 72 and 74, respectively. Particularly, as shown in FIG. 2, shaft 60 includes a set of keys 66, one on each end 62 and 64 of the shaft 60, which are spaced apart 180 degrees on the radial axis of shaft 60 and are positioned along the same centerline from end to end of shaft 60. Keys 66 engage with corresponding mating keys (not shown) formed inside each of the hubs 76 of impellers 72 and 74. Once keys 66 are engaged with the corresponding keys of impellers 72 and 74, as seen in FIG. 3, the impellers 72 and 74 rotate simultaneously with the rotation of shaft 60.

Furthermore, in the preferred embodiment, as shown in FIGS. 8-9, shaft 60 is magnetic and the means to rotate shaft 60 is at least one magnet 80 enclosed within magnet chamber 28 of housing 20. In the preferred embodiment, as seen best in FIGS. 8-9, housing 20 encloses a stator 80 enclosed within magnet chamber 28 creating alternating magnetic fields when energized to cause rotation of magnetic shaft 60. Stator 80 is encapsulated by an epoxy overcoating poured over the stator 80 after installed in housing 20. Such magnetic drive means and the electrical connections required to energize stator 80 and to cause rotation of shaft 60 would be well known to those having ordinary skill in the art. The particular stator 80 utilized can vary according to the voltage of the electrical power source and strength needed to rotate shaft 60 and impellers 72 and 74 to produce the required water velocity.

As discussed above, shaft 60 has two opposite ends 62 and 64, to which two impellers 72 and 74, respectively, are attached. During operation, rotation of shaft 60 as a result of stator 80, simultaneously rotates impeller 72 within volute 32 as well as impeller 74 within volute 34 and creates suction within volutes 32 and 34. As seen best in FIGS. 6-7 and 9, paddles 78 and 77 on each of impellers 72 and 74, respectively, when rotated, move water in a circular motion inside volutes 32 and 34, respectively. Impellers 72 and 74 move a certain volume of water based on the strength of stator 80 driving rotation of shaft 60. The strength of stator 80 and the rate of rotation of shaft 60 can vary depending on the specific application and volume of water to be pumped.

More particularly, during operation of the present invention, on the water pump side 22 of housing 20, impeller 72 rotates within volute 32 to create suction to draw water into volute 32 via inlet 31. The water is then circulated within volute 32 and discharged from volute 32 via outlet 33, back into the water 102. The volute outlet 33 on the water pump side 22 can be discharged directly back into water 102 or it can be connected to various attachments, such as, for example, a filter or waterfall. In the preferred embodiment, the gallons per hour (GPH) outflow on first end 22 of pump 10 is approximately 1300 GPH. However, it can be appreciated that other desirable flow rates are possible.

The opposite end 24 of housing 20 serves to introduce air 103 into the water 102. As seen in FIG. 6, the novel and unique impeller 74 and volute 34 assembly creates suction to draw air and water into volute 34, in order to introduce a substantial amount of air 103 into the water 102 during rotation of shaft 60, and in turn, impeller 74. Particularly, as seen in FIGS. 1 and 6, aeration of water 102 occurs by drawing in air from the atmosphere above waterline 104 via tube 50 connected to hollow stem 48 on volute 34. As seen in FIG. 6, end 52 of tube 50 is connected to a hollow stem 48 that is molded into the upper surface of venturi tube 44. The opposite end 54 of the tube 50 is disposed above the waterline 104 and is exposed to the air in the atmosphere. Positioning end 54 in communication with the atmosphere allows air to enter tube 50 and, in turn, into venturi tube 44 of volute 34, to be introduced into water 102.

More particularly, during operation of the present invention, impeller 74 rotates, as a result of rotation of shaft 60, and creates suction to draw water from pond 100 through venturi tube 44 of inlet 35 and into volute chamber 34. At the same time, rotation of impeller 74 creates suction to simultaneously draw air in from the atmosphere via end 54 of tube 50. The air travels down through flexible tube 50 and atmosphere via end 54 of tube 50. The air travels down through flexible tube 50 and exits end 52 into stem 48 of inlet 35. The U-shaped structure of impeller paddles 77 of impeller 74 have just enough surface area to draw a minimal volume of water into the inlet 35 of volute 34. In the preferred embodiment, the velocity at which air exits volute 34 on side 24 of pump 10 is approximately 0.167 cubic feet per minute (CFM). However, the specific air velocity can vary.

Figure 10:
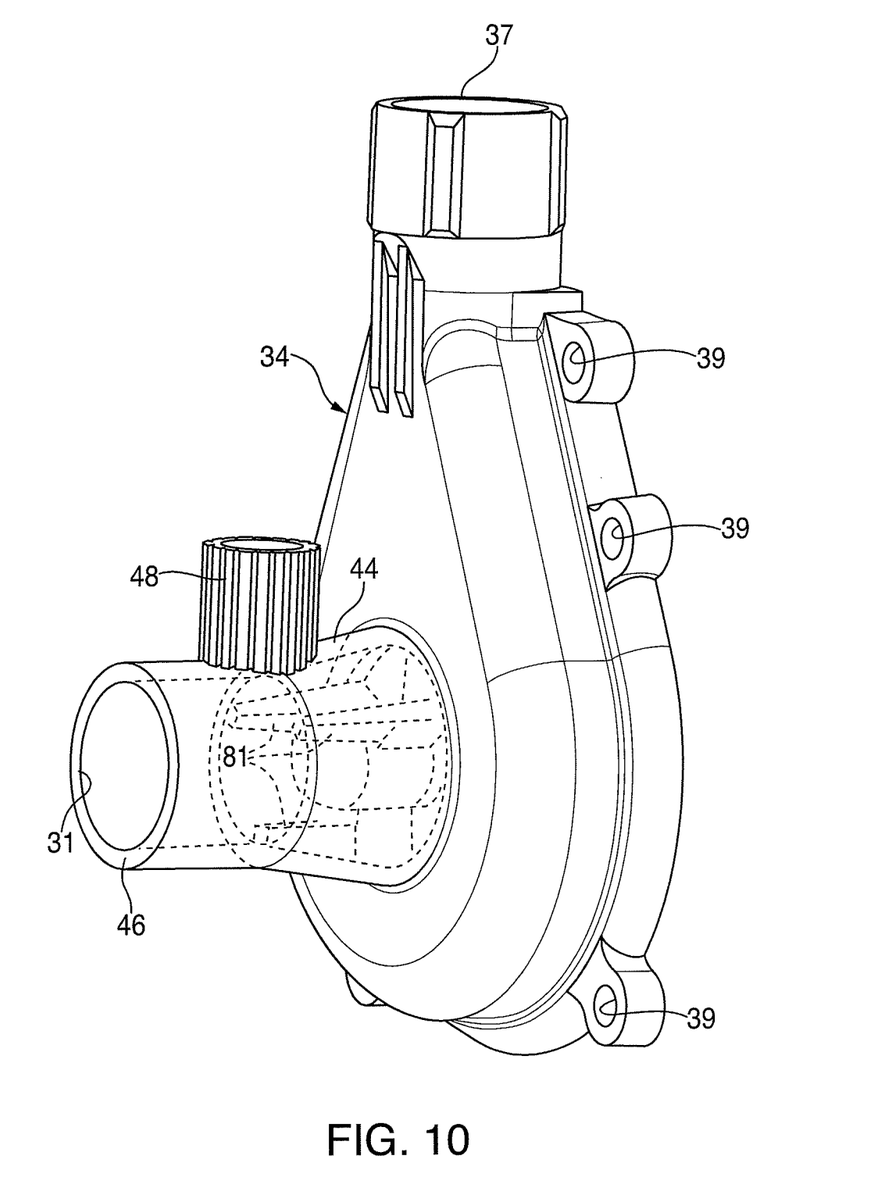
FIG. 10 is a perspective view of the volute of the air pump side of the present invention removed from the housing and showing the three interior ribs.

As water is drawn into inlet 35 of volute 34, the water is met with resistance due the three linear ribs 81 formed on the inside surface of venturi tube 44 of inlet 35 (See, FIG. 10). As seen best in FIG. 10, these three linear ribs 81 create a disturbance of the normally smooth flow of water since they are positioned perpendicular to the flow of the water entering inlet 35 of volute 34. This starts the process of cavitation since the air that is being drawn in through tube 50 is visibly trapped along the inside corners of ribs 81.

Once this mix of air and water in inlet 35 has been exposed to the rotating impeller 74, cavitation occurs. Particularly, the U-shaped impeller paddles 77 of impeller 74 "chop up" water 102 within volute 34 and create air bubbles 103 that will exit the outlet 37 of volute 34. The U-shape of impeller paddles 77 is also such that the paddles are of a reduced size and have a reduced surface area, when compared to existing impeller designs. Impeller 74 then causes the air/water mix to be released into pond 100 via outlet 37.

In the preferred embodiment, outlet 37 of volute 34 includes a diffuser 90 attached thereto, to diffuse or spread out the air bubbles 103 emitted from outlet 37, so, as seen in FIG. 8, the present invention includes an air diffuser 90 connected to outlet 37 of volute 34. Air diffuser 90 includes a generally vertically disposed hollow tube 92 extending upwardly, in line with outlet 37 of volute 34. Tube 92 defines a central opening in fluid communication with outlet 37 of volute 34. Tube 92 also has an outer peripheral edge with a generally horizontally disposed lower rim 94 extending outwardly therefrom. Diffuser 90 also includes a generally horizontally disposed ceiling plate 96 which is disposed above and spaced apart from tube 92 and rim 94, to diffuse air bubbles 103 laterally. Particularly, air bubbles 103 exiting outlet 37 travel upwardly and come into contact with plate 96 and are spread out laterally. Thus, diffuser 90 causes the air bubbles exiting outlet 37 of volute 34 to travel in an upward and outward direction, rather than straight up and out of outlet 37 of volute 34.

In addition, as seen best in FIGS. 4-5, the pump 10 of the present invention includes two bubble barriers 26, one on each end 22 and 24 of housing 20. Particularly, since there are two rotating impellers 72 and 74 that are driven by the same magnetic shaft 60 and share the same magnet chamber 28, issues can arise with air bubbles on the air pump side 24 of pump 10 inadvertently traveling into and through magnet chamber 28 and into the water end 22 of the pump 10. However, the water pump on first end 22 and the air pump on second end 24 must be kept separate and operate independently, yet simultaneously. Accordingly, in order to prevent air bubbles from entering magnetic chamber 28 from air pump side 24 and into the water pump side 22, bubble barriers 26 are provided.

As seen in FIGS. 4-5, bubble barriers 26 are generally ring-shaped thin walled plastic discs, preferably made of, but not limited to, DELRIN material which is manufactured by E. I. Du Pont De Nemours and Company. In the preferred embodiment, bubble barriers 26 have an outer diameter of 2.10" and a thickness of 0.05". However, it can be appreciated that the dimensions can vary and other suitable materials may be utilized. Bubble barriers 26 are mounted peripherally on hubs 76 of impellers 72 and 74 between the rear edges of the impeller paddles 78 and 77, respectively, and the side walls 21 and 23 of magnet chamber 28, as seen in FIGS. 4-5. The purpose of bubble barriers 26 is to prevent the air bubbles created by impeller 74 from traveling through the magnet chamber 28 into the opposite end 22 of the pump 10 and exit the outlet 33 of the volute 32 on the water side 22 of pump 10.

While particular embodiments of the invention have been described, it is not intended that the invention be limited thereto, as it is intended that the invention be as broad in scope as the prior art will allow and that the specification be read likewise. It will therefore be appreciated by those skilled in the art that other modifications could be made thereto without departing from the spirit and scope of the invention.

What is claimed is:

1. A combination water pump and air pump for simultaneously circulating and aerating water, comprising:
  a housing having a first end defining a first chamber having an inlet for water to be drawn into said first chamber and an outlet for water to exit said first chamber, said housing having an opposite second end defining a second chamber having an inlet for water to be drawn into said second chamber, means to draw air into said second chamber, and an outlet for aerated water to exit said second chamber;
  a rotatable shaft extending through said housing, having a first end and an opposite second end;
  a first rotatable impeller for circulating water, disposed within said first chamber and connected to said first end of said shaft, and a second rotatable impeller for aerating water, disposed within said second chamber and connected to said second end of said shaft, wherein rotation of said shaft simultaneously rotates said first and second impellers to circulate water within said first and said second chambers, respectively; and
  means to rotate said shaft.

2. The pump according to claim 1, wherein:
  said shaft has a key on each of said first and second ends thereof and said first and second impellers each have a corresponding key which engages with said keys on said first and second ends of said shaft, respectively.

3. The pump according to claim 1, wherein:
  said first and second impellers each further comprise a central hub which engages with said first and second ends of said shaft, respectively, and a plurality of paddles connected to said central hub and extending outwardly therefrom.

4. The pump according to claim 3, wherein:
  said paddles on said second impeller are generally U-shaped.

5. The pump according to claim 1, wherein:
  said shaft is magnetic and said means to rotate said shaft and said impellers is at least one magnet enclosed within said housing.

6. The pump according to claim 5, wherein:
  said means to rotate said shaft and said impellers is a stator enclosed within said housing, which creates alternating magnetic fields to rotate said shaft.

7. The pump according to claim 1, wherein:
  said second chamber further comprises an upwardly projecting hollow stem defining an air inlet opening and said means to draw air into said second chamber comprises a hollow tube, having opposite open ends, one of which is connected to said hollow stem and the other of which is communicatable with atmosphere, to draw air into said air inlet opening.

8. The pump according to claim 1, further comprising:
  a diffuser connected to said outlet of said second chamber, said diffuser comprising a generally vertically disposed hollow tube extending upwardly from said outlet of said second chamber, said hollow tube having an outer peripheral edge and a generally horizontally disposed rim extending outwardly from said outer peripheral edge, said diffuser further comprising a generally horizontally disposed ceiling disposed above said hollow tube, which is connected to and spaced-apart from said rim, to diffuse air bubbles horizontally.

9. The pump according to claim 3, further comprising:
  ring-shaped bubble barriers mounted over said hubs of said first and second impellers, to prevent air bubbles from entering said housing.

10. The pump according to claim 1, wherein:
  said first and second chambers are volutes.

11. The pump according to claim 1, wherein:
  said shaft is generally cylindrically shaped.

12. The pump according to claim 1, wherein:
  said inlet of said second chamber is tapered and comprises ribs formed on an inside surface thereof.

13. A method for simultaneously moving and oxygenating water, comprising the steps of:
  providing a body of water;
  providing a combination water pump and air pump for simultaneously circulating and aerating water, comprising a housing having a first end defining a first chamber having an inlet for water to be drawn into said first chamber and an outlet for water to exit said first chamber, said housing having an opposite second end defining a second chamber having an inlet for water to be drawn into said second chamber, means to draw air into said second chamber, and an outlet for aerated water to exit said second chamber; a rotatable shaft extending through said housing, having a first end and an opposite second end; a first rotatable impeller for circulating water, disposed within said first chamber and connected to said first end of said shaft, and a second rotatable impeller for aerating water, disposed within said second chamber and connected to said second end of said shaft, wherein rotation of said shaft simultaneously rotates said first and second impellers to circulate water within said first and said second chambers, respectively; and means to rotate said shaft;
  submersing said combination water pump and air pump into said water;
  rotating said shaft and said impellers simultaneously via said means to rotate, to draw water into said inlet of first chamber and to draw water and air into said second chamber; and discharging water from said outlet of said first chamber and discharging aerated water from said outlet of said second chamber.

14. The method according to claim 13, wherein:

said body of water is a pond.

15. The method according to claim 13, wherein:

said shaft has a key on each of said first and second ends thereof and said first and second impellers each have a corresponding key which engages with said keys on said first and second ends of said shaft, respectively.

16. The method according to claim 13, wherein:

said first and second impellers each further comprise a central hub which engages with said first and second ends of said shaft, respectively, and a plurality of paddles connected to said central hub and extending outwardly therefrom.

17. The method according to claim 16, wherein:

said paddles on said second impeller are generally U-shaped.

18. The method according to claim 13, wherein:

said shaft is magnetic and said means to rotate said shaft and said impellers is at least one magnet enclosed within said housing.

19. The method according to claim 18, wherein:

said means to rotate said shaft and said impellers is a stator enclosed within said housing, which creates alternating magnetic fields to rotate said shaft.

20. The method according to claim 13, wherein:

said second chamber further comprises an upwardly projecting hollow stem defining an air inlet opening and said means to draw air into said second chamber comprises a hollow tube, having opposite first and second open ends, said first end being connected to said hollow stem and said second end being communicatable with atmosphere, to draw air into said air inlet opening;

and said method further comprises the step of positioning said second open end of said hollow tube in communication with atmosphere, to draw air into said air inlet opening.

\* \* \* \* \*